Patented Sept. 27, 1949

2,482,810

UNITED STATES PATENT OFFICE 2,482,810

METHOD OF PRODUCING ARYL PHOSPHORUS OXYDICHLORIDE

Arthur Dock Fon Toy, Chicago, Ill., assignor to Victor Chemical Works, a corporation of Illinois No Drawing. Application November 14, 1945, Serial No. 628,669

12 Claims. (Cl. 260—543)

1

This invention relates to a method of making aryl phosphorus oxydichlorides.

This invention is a continuation-in-part of my co-pending application Serial No. 517,438, filed January 7, 1944, which has since become abandoned.

Heretofore no safe and economical method of producing aryl phosphorus oxydichloride has been known. In accordance with the present invention aromatic phosphorus oxydichlorides may be produced by simultaneous production of these compounds and phosphorus oxychloride from the corresponding aromatic phosphorus dichloride. The new process involves the reaction of the aromatic phosphorus dichloride with chlorine and phosphoric anhydride. The reaction takes place substantially in accordance with the following equation:

$$3RPCl_2 + 3Cl_2 + P_2O_5 \rightarrow 3RPOCl_2 + 2POCl_3$$

In general the process comprises forming a slurry of finely divided phosphoric anhydride in the aryl phosphorus dichloride, preferably in liquid form, and then chlorinating this mixture by bubbling in gaseous chlorine. The chlorination is carried out in a vessel equipped with an agitator and a reflux condenser. The chlorine is added at such a rate that the reaction heat maintains a suitable refluxing temperature for the phosphorus oxychloride component of the products. A suitable temperature is of the order of 125–150° C. When the chlorination is completed and no further heat of reaction is produced, the addition of chlorine is stopped. The charge is then heated by the application of external heat to distill off the phosphorus oxychloride. The residual liquid product is substantially pure aryl phosphorus oxydichloride which may be further purified by distillation under vacuum.

The aryl phosphorus oxydichlorides are valuable intermediates for use in the synthesis of a number of organic phosphorus compounds containing carbon to phosphorus bonds such as phosphonic acids, esters, resins, etc.

As an example of the process, 1611 grams (9 moles) of phenyl phosphorus dichloride was placed in a three-necked flask equipped with a reflux condenser, stirrer, thermometer, and chlorine inlet. 511 grams (3.6 moles) of finely divided phosphoric anhydride was added and slurried with the phenyl phosphorus dichloride. Chlorine gas was then passed into the slurry at a rate sufficient to cause the heat of reaction to maintain a temperature sufficiently high to give a steady refluxing of the phosphorus oxychloride

2 formed in the reaction. A temperature of about 150° C. was employed in the present example. After about three to four hours the temperature dropped, indicating completion of the chlorination. The addition of chlorine was discontinued and the flask heated externally to distill off the phosphorus oxychloride. A total of 911 grams was recovered, representing a 99.2% yield and recovery of the by-product phosphorus oxychloride. The liquid phenyl phosphorus oxydichloride remaining in the flask was then recovered by distillation in vacuo. 1550 grams of substantially pure phenyl phosphorus oxydichloride, boiling at 137–138° C. under 15 mm. pressure, was recovered, representing a yield of 88.4%. Any excess phosphoric anhydride remains in the flask and may be used again as part of the next charge. An excess of phosphoric anhydride is not required for the reaction, but does function in speeding up the time required for completing the chlorination.

Tolylphosphorus oxydichloride was prepared by placing in a three-necked flask equipped with a stirrer, thermometer, and condenser, 200 g. of tolylphosphorus dichloride and 54 g. of phosphoric anhydride. The amount of phosphoric anhydride includes about ten percent excess over that required by the equation

$$3CH_3C_6H_4PCl_2 + P_2O_5 + 3Cl_2 \rightarrow 3CH_3C_6H_4\overset{O}{\underset{\|}{P}}Cl_2 + 2POCl_3$$

Into this slurry was bubbled a steady stream of chlorine gas while maintaining a temperature of about 35° to 40° C. After 2 hours the reaction was complete as indicated by the drop in temperature while continuing the addition of chlorine. The addition of chlorine was stopped and the liquid reaction mixture distilled at atmospheric pressure to remove the phosphorus oxychloride, and then under reduced pressure to distill off the tolylphosphorus oxydichloride product which had a boiling point of 140° to 142° C. at 11 mm. pressure. The yield of the product was 190 g. (87.5% of theory). The yield of by-product phosphorus oxychloride (POCl₃) was 90 grams (85% of theory).

Chlorophenylphosphorus oxydichloride (ClC₆H₄POCl₂)

was prepared using substantially the same procedure as in the preceding example. 200 g. of chlorophenylphosphorus dichloride and 50 g. of phosphoric anhydride were chlorinated with an excess of chlorine gas. The chlorophenylphosphorus oxydichloride product recovered had a boiling point of 104–105° C. at 4–5 mm. pressure. The yield was 192 g. representing 88% of theoretical.

The process of the second preceding example (tolylphosphorus oxydichloride) was repeated except that the chlorination was carried out at a temperature of about 145° C. induced by the heat of reaction resulting from a more rapid addition of the chlorine gas. In this example 150 g. tolylphosphorus dichloride and 40 g. of phosphoric anhydride were employed. After the chlorination was completed the product was fractionally distilled, first under atmospheric pressure to remove the phosphorus oxychloride, then under reduced pressure to obtain the tolylphosphorus oxydichloride product. The yield was 140 g. or 91.7% of theoretical. The boiling point of the product was 140–142° C. at 11–12 mm.

The foregoing detailed description has been given for clearness of understanding only, and no unnecessary limitations should be understood therefrom.

What I claim as new, and desire to secure by Letters Patent, is:

1. The process which comprises reacting an aryl phosphorus dichloride with phosphoric anhydride and gaseous chlorine to produce the corresponding aryl phosphorus oxydichloride and phosphorus oxychloride.

2. The process of making an aryl phosphorus oxydichloride which comprises adding an excess of phosphoric anhydride to an aryl phosphorus dichloride and passing in gaseous chlorine to produce the corresponding aryl phosphorus oxydichloride and phosphorus oxychloride, and separating the phosphorus oxychloride therefrom by distillation, said chlorine being passed in at such a rate as to maintain a refluxing temperature for the phosphorus oxychloride.

3. The process which comprises reacting phenyl phosphorus dichloride with phosphoric anhydride and gaseous chlorine under conditions to produce phenyl phosphorus oxydichloride and phosphorus oxychloride.

4. The process which comprises reacting at approximately 125°–150° phenyl phosphorus dichloride with an excess of phosphoric anhydride and gaseous chlorine to produce phenyl phosphorus oxydichloride and phosphorus oxychloride, and separating the phosphorus oxydichloride by distillation.

5. The process of making phenyl phosphorus oxydichloride which comprises forming a slurry of phenyl phosphorus dichloride and an excess of phosphoric anhydride and passing chlorine gas into the slurry until the phenyl phosphorus dichloride has been substantially converted to phenyl phosphorus oxydichloride with the formation of phosphorus oxychloride, separating the phosphorus oxychloride, and then removing the phenyl phosphorus oxydichloride from the residual material by vacuum distillation.

6. In the manufacture of phenyl phosphorus oxydichloride from phenyl phosphorus dichloride by the addition of phosphoric anhydride and chlorine gas, the step of adding chlorine gas to a phenyl phosphorus dichloride-phosphoric anhydride mix at a rate sufficient to maintain a temperature of 125° to 150° C.

7. The process of claim 1 in which the aryl phosphorus dichloride is tolylphosphorus dichloride.

8. The process of claim 1 in which the aryl phosphorus dichloride is chlorophenylphosphorus dichloride.

9. The process which comprises reacting at approximately 125°–150° C. an aryl phosphorus dichloride with phosphoric anhydride and chlorine supplied from gaseous chlorine to produce the corresponding aryl phosphorus oxydichloride and phosphorus oxychloride.

10. The process of making an aryl phosphorus oxydichloride which comprises adding an excess of phosphoric anhydride to an aryl phosphorus dichloride and passing in chlorine gas to produce the corresponding aryl phosphorus oxydichloride and phosphorus oxychloride, and separating the phosphorus oxychloride therefrom by distillation, said reaction being maintained at a temperature of approximately 125° to 150° C.

11. The process which comprises reacting at approximately 125–150° C. phenyl phosphorus dichloride with phosphoric anhydride and chlorine supplied as a gas to produce phenyl phosphorus oxydichloride and phosphorus oxychloride.

12. The process of making an aryl phosphorus oxydichloride which comprises forming a slurry of aryl phosphorus dichloride and an excess of phosphoric anhydride and passing chlorine gas into the slurry until the phosphorus dichloride has been substantially converted to the aryl phosphorus oxydichloride with the formation of phosphorus oxychloride, separating the phosphorus oxychloride, and then removing the aryl phosphorus oxydichloride from the residual material.

ARTHUR DOCK FON TOY.

No references cited.